US012313895B2

(12) United States Patent
Ray

(10) Patent No.: US 12,313,895 B2
(45) Date of Patent: May 27, 2025

(54) PLATFORM FOR MULTILAYER STACK OF FIBER OPTIC SPLICE HOLDERS

(71) Applicant: Amphenol Network Solutions, Inc., Liberty Lake, WA (US)

(72) Inventor: Craig Dwayne Ray, Raleigh, NC (US)

(73) Assignee: Amphenol Network Solutions, Inc., Liberty Lake, WA (US)

( * ) Notice: Subject to any disclaimer, the term of this patent is extended or adjusted under 35 U.S.C. 154(b) by 159 days.

(21) Appl. No.: 18/008,002

(22) PCT Filed: May 21, 2021

(86) PCT No.: PCT/US2021/033683
§ 371 (c)(1),
(2) Date: Dec. 2, 2022

(87) PCT Pub. No.: WO2021/247257
PCT Pub. Date: Dec. 9, 2021

(65) Prior Publication Data
US 2023/0244052 A1    Aug. 3, 2023

Related U.S. Application Data

(60) Provisional application No. 63/034,251, filed on Jun. 3, 2020.

(51) Int. Cl.
G02B 6/44    (2006.01)
(52) U.S. Cl.
CPC ......... *G02B 6/4454* (2013.01); *G02B 6/4452* (2013.01); *G02B 6/4455* (2013.01)

(58) Field of Classification Search
None
See application file for complete search history.

(56) References Cited

U.S. PATENT DOCUMENTS

| | | | | | |
|---|---|---|---|---|---|
| 5,278,933 | A | * | 1/1994 | Hunsinger | ........... G02B 6/4442 385/98 |
| 5,515,472 | A | * | 5/1996 | Mullaney | ............. G02B 6/4471 385/136 |
| 6,009,225 | A | * | 12/1999 | Ray | ....................... G02B 6/4442 385/135 |

(Continued)

FOREIGN PATENT DOCUMENTS

WO    2018156728 A1    8/2018

*Primary Examiner* — Jerry Rahll
(74) *Attorney, Agent, or Firm* — Lee & Hayes, P.C.

(57) ABSTRACT

A fiber optic cable and splice storage compartment (406) includes a lower panel (412), a plurality of receptacles (208) disposed on or within the lower panel (412), each of the receptacles (208) being dimensioned to insertably receive and retain a rectangular fiber optic splice holder (100), a plurality of retaining walls (414) at peripheral edges of the lower panel (412), each of the retaining walls (414) comprising a lower section (428) that adjoins the lower panel (412) and an upper section (430) that adjoins the lower section (428), one or more gaps (416) between immediately adjacent ones of the retaining walls (414), and first and second bend controls (418) disposed on the lower panel (412). The plurality of receptacles (208) is between the first and second bend controls (418). The first and second bend controls (418) each comprise a curved surface that extends transversely to the lower panel (412).

19 Claims, 11 Drawing Sheets

(56) References Cited

U.S. PATENT DOCUMENTS

| | | | | |
|---|---|---|---|---|
| 6,507,691 B1* | 1/2003 | Hunsinger | ............ | G02B 6/4454 385/136 |
| 2012/0243845 A1* | 9/2012 | Wright | ................. | G02B 6/4454 29/428 |
| 2016/0187603 A1 | 6/2016 | Ray | | |

* cited by examiner

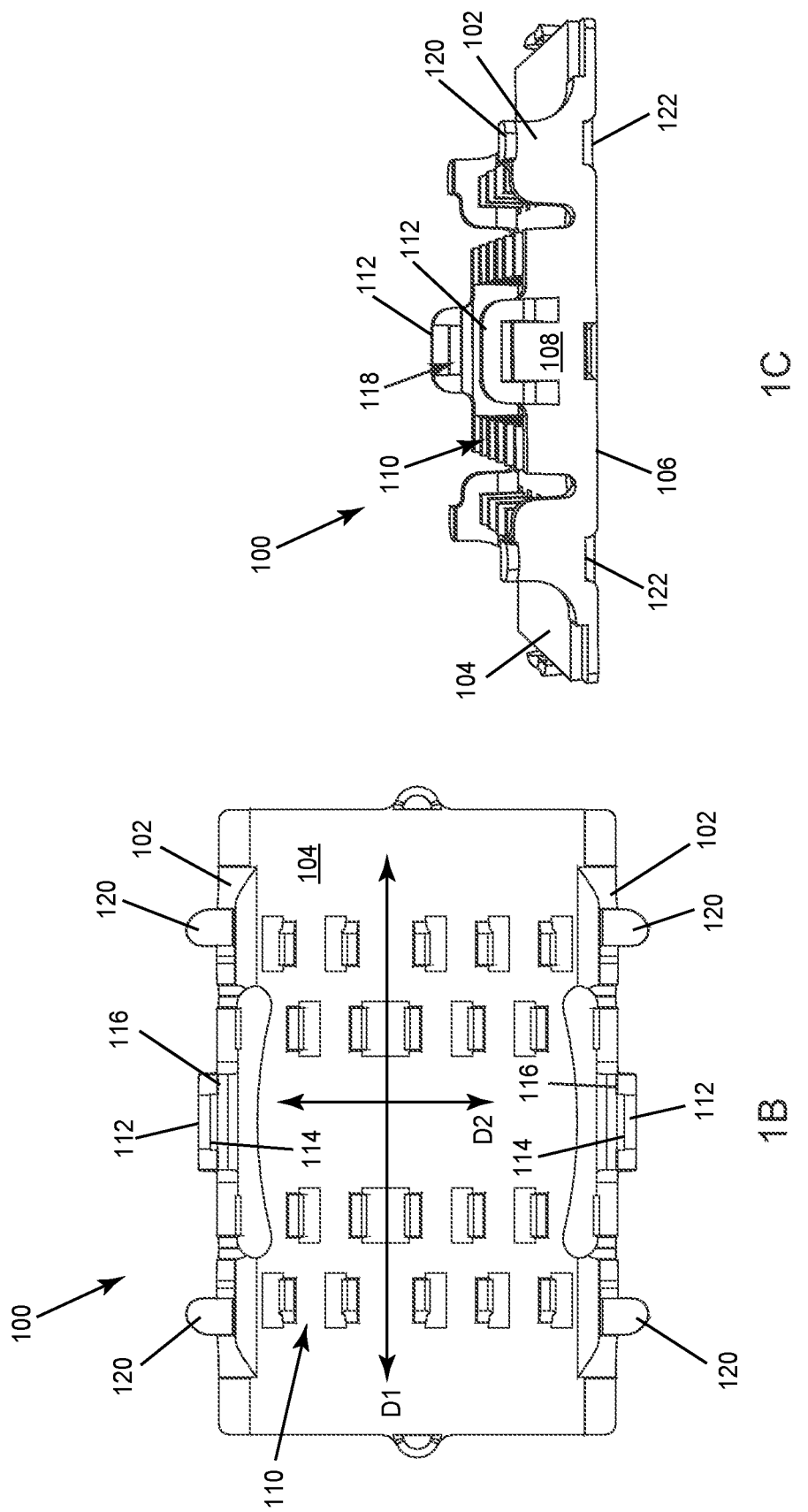

PLATFORM FOR MULTILAYER STACK OF FIBER OPTIC SPLICE HOLDERS

TECHNICAL FIELD

The present invention generally relates to telecommunication hardware, and particularly relates to devices for mounting and storing splices of fiber optic cable.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages, such as increased bandwidth over distance with lower losses and maintenance, in comparison to traditional electrical transmission techniques.

Fiber optic networks include fiber optic connection boxes to store and secure splices of optical fiber and associated lengths of fiber optic cable. These fiber optic connection boxes are often provided at a network termination point. For example, a fiber optic connection box may be provided at a network termination point between service-provider network cabling and customer-side fiber optic cabling.

Modern network bandwidth and connectivity demands for fiber optic networks result in increasing number of fiber optic cables and/or increasing number of optical fibers per cable at a given termination point. As a result, installers may find it difficult or impossible to effectuate all necessary splices and store each splice securely within a standard sized fiber optic connection box.

SUMMARY

A fiber optic splice holder is disclosed. According to an embodiment, the fiber optic splice holder includes first and second sidewalls that are laterally spaced apart from one another, a floor section adjoining lower ends of the first and second sidewalls and extending between the first and second sidewalls, one or more optical splice retainers disposed between the first and second sidewalls on an upper surface of the floor section, and first and second stacking retention features that are disposed the first and second sidewalls, respectively. The first and second stacking retention features form a pair of opposing surfaces that are above the upper edge sides of the first and second sidewalls. The pair of opposing surfaces are separated from one another by a distance that is correlated to a base width of the fiber optic splice holder, the base width being a separation distance between outer surfaces of the first and second sidewalls that face away from one another.

According to another embodiment, the fiber optic splice holder includes first and second sidewalls that are laterally spaced apart from one another, a floor section adjoining lower ends of the first and second sidewalls and extending between the first and second sidewalls, one or more optical splice retainers disposed between the first and second sidewalls on an upper surface of the floor section, a notch formed in lower corners of the first and second sidewalls, and an angled protrusion disposed at upper corners of the first and second sidewalls, wherein the angled protrusion is dimensioned to be inserted in the notch.

A fiber optic assembly is disclosed. According to an embodiment, the fiber optic assembly includes first and second fiber optic splice holders, each of the first and second fiber optic splice holders including first and second sidewalls that are laterally spaced apart from one another, a floor section adjoining lower ends of the first and second sidewalls and extending between the first and second sidewalls, and stackability features formed in the first and second sidewalls, the second fiber optic splice holder is stacked on top of the first fiber optic splice holder, and the stackability features of the first fiber optic splice holder interface with the first and second sidewalls of the second fiber optic splice holder such that the second fiber optic splice holder is securely retained against the first fiber optic splice holder.

A fiber optic cable and splice storage compartment is disclosed. According to an embodiment, the storage compartment includes a lower panel, a plurality of receptacles disposed on or within a planar surface of the lower panel, each of the receptacles being dimensioned to insertably receive and retain a rectangular fiber optic splice holders, a plurality of retaining walls disposed at peripheral edges of the lower panel, each of the retaining walls comprising a lower section that adjoins the lower panel and an upper section that adjoins the lower section and extends over the lower panel, one or more gaps between immediately adjacent ones of the retaining walls, first and second bend controls disposed on the lower panel. The plurality of receptacles is disposed between the first and second bend controls. The first and second bend controls each comprise a curved surface that extends substantially transversely to the lower panel.

A fiber optic cable and splice storage assembly is disclosed. According to an embodiment, the assembly comprises a storage compartment, the storage compartment comprising a lower panel, a plurality of receptacles disposed on or within a planar surface of the lower panel, a plurality of retaining walls disposed at peripheral edges of the lower panel, each of the retaining walls comprising a lower section that adjoins the lower panel and an upper section that adjoins the lower section and extends over the lower panel, one or more gaps between immediately adjacent ones of the retaining walls, and first and second bend controls disposed on the lower panel, a plurality of fiber optic splice holders, each of the fiber optic splice holders comprising first and second sidewalls that are laterally spaced apart from one another, a floor section adjoining lower ends of the first and second sidewalls and extending between the first and second sidewalls, one or more optical splice retainers disposed between the first and second sidewalls on an upper surface of the floor section. The fiber optic splice holders comprise a first level of the fiber optic splice holders that are securely retained by the receptacles with the floor section of the fiber optic splice holders facing the lower panel.

BRIEF DESCRIPTION OF THE DRAWINGS

FIGS. 1A, 1B, and 1C, depicts a fiber optic splice holder, according to an embodiment. FIG. 1A depicts an isometric view of the fiber optic splice holder; FIG. 1B depicts a plan-view view of the fiber optic splice holder; and FIG. 1C depicts a side view of the fiber optic splice holder.

FIGS. 8A, 8B and 8C, depicts an assembly that includes a fiber optic cable and splice storage compartment, a coil of fiber optic cable, and a stack of fiber optic splice holders, according to an embodiment. FIG. 8A depicts a side view of the assembly with the storage compartment in an extracted position and tilted downward, FIG. 8B depicts another side view of the assembly in the extracted position and tilted downward, and FIG. 8C depicts a frontal view of the storage compartment in a stored position.

DETAILED DESCRIPTION

Figure 1:
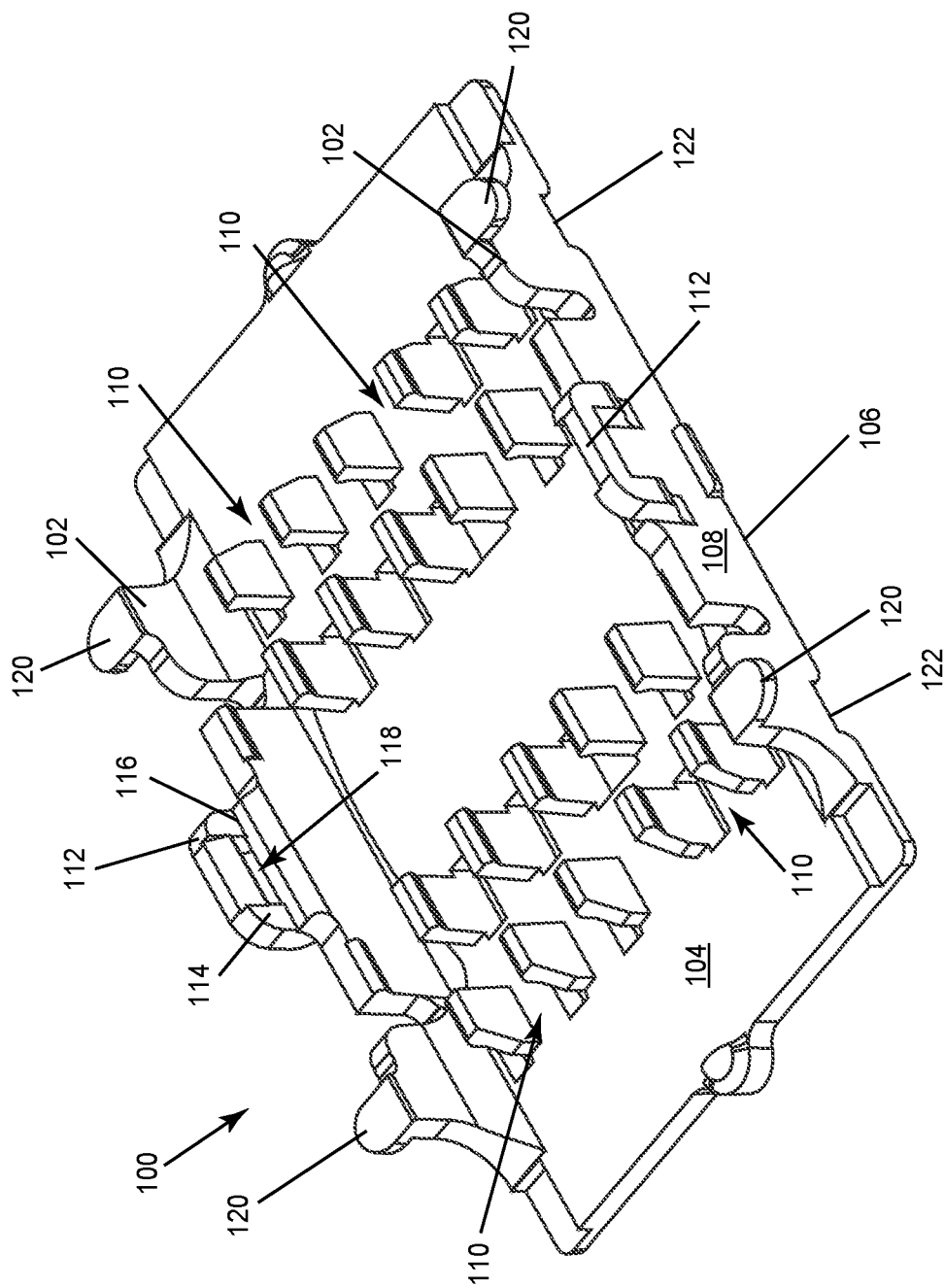
FIG. 1, which includes

Embodiments of a fiber optic splice holder are described herein. The fiber optic splice holder is a modular tray with optical splice retainers that are designed to securely retain splices of optical fiber. The optical splice retainers are disposed on a floor section of the tray between a pair of opposing outer sidewalls. The outer sidewalls are configured as rails that physically support an identical fiber optic splice holder stacked on top of the fiber optic splice holder.

Advantageously, the fiber optic splice holder includes stackability features formed in the outer sidewalls. In the stacked position, the stackability features of the subjacent fiber optic splice holder interface with the outer sidewalls of the superjacent fiber optic splice holder such that the superjacent fiber optic splice holder is securely retained against the subjacent fiber optic splice holder. In this way, the stackability features mechanically couple the fiber optic splice holders together. In an embodiment, the stackability features include a pair of stacking retention features on the outer sidewalls. In the stacked position, inner surfaces of the stacking retention features from the subjacent fiber optic splice holder face the outer sidewalls of the superjacent fiber optic splice holder that rests on the outer sidewalls. In an embodiment, the stackability features include stacking interlock features and corresponding stacking notches on the outer sidewalls. In the stacked position, the stacking interlock features of the subjacent fiber optic splice holder engage with the notches of the superjacent fiber optic splice holder. In an embodiment, the stackability features include a notch formed in lower corners of the outer sidewalls, and an angled protrusion disposed at upper corners of outer sidewalls. In the stacked position, the angled protrusion of the subjacent fiber optic splice holder is inserted in the notch of the superjacent fiber optic splice holder.

Collectively, the stackability features enable an installer to easily create a multi-tiered stack of the fiber optic splice holders that is mechanically stable and positionally aligned. This multi-tiered stack can be employed at fiber optic network splice points, e.g., telecommunications boxes, with advantageous splice density and ease of access to the splices.

Embodiments of a fiber optic cable and splice storage assembly are described herein. The assembly includes a storage compartment. The storage compartment is designed to accommodate a coil of fiber optic cables and a vertical stack of multiple optical splice retainers, which in turn securely retains splices of optical fibers from the coil of fiber optic cable. The storage compartment incudes retaining walls and bend controls that organize and retain the coil of fiber optic cables. Additionally, the storage compartment includes receptacles that securely retain multiple ones of the fiber optic splice holders, each of which provide a vertical stack of multiple optical splice retainers.

Advantageously, the fiber optic cable and splice storage assembly can accommodate high count fibers, fiber slack storage and equivalent mass fusion splices all on a common platform. By accommodating a multi-layer stack of the fiber optic splice holders, a very high number of optical splices can be provided in a single storage compartment. In fact, the storage compartment has a capacity to secure and store splices between 288, 432, 576, 864, 1152 or 1728 optical fibers and the excess fiber optic cable associated with these splices. By storing large groups of fiber cable (e.g., rollable ribbon fiber) at one time instead of single ribbon, the amount of time required to store splices is reduced by orders of magnitude in comparison to conventional storage solutions. The arrangement and design of the retaining walls and bend controls enables secure organization of a very large coil of cable, such as a coil of ribbon fiber optic cable with a diameter of at least 12 inches and a height of least 1.25 inches, while simultaneously providing easy access to the cable and associated splices by an installer. In an embodiment, the storage compartment is part of a rack assembly that allows the storage compartment to be extracted and tilted downward. This improves access to the optical splices, reduces slack length requirements enables easy storage of the fiber loop lengths.

Referring to FIG. 1, a fiber optic splice holder 100 is depicted, according to an embodiment. The fiber optic splice holder 100 includes first and second sidewalls 102 that are laterally spaced apart from one another. The first and second sidewalls 102 may be parallel to one another in a first direction (D1) (shown in FIG. 1B) that runs along a length of the sidewalls 102. The fiber optic splice holder 100 additionally includes a floor section 104. The floor section 104 adjoins lower ends of the first and second sidewalls 102 and laterally extends between the first and second sidewalls 102. The fiber optic splice holder 100 includes first and second angled intersections 106 between outer surfaces 108 of the first and second sidewalls 102, respectively, and a lower surface of the floor section 104. The outer surfaces 108 of the first and second sidewalls 102 and the lower surface of the floor section 104 may be substantially planar surfaces. Moreover, the first and second angled intersections 106 may be 90-degree intersections. More generally, the sidewalls 102 and the floor section 104 of the fiber optic splice holder 100 can be arranged in conduit shaped configuration that provides two rails and a floor around an interior volume. Examples of these conduit shaped configurations include U-shapes, C-shapes, etc.

The fiber optic splice holder 100 includes optical splice retainers 110. The optical splice retainers 110 are disposed between the first and second sidewalls 102 and on an upper surface of the floor section 104 that is opposite from the lower surface of the floor section 104. That is, the optical splice retainers 110 are disposed within the three-dimensional volume defined by the first and second sidewalls 102 and the floor section 104.

The fiber optic splice holder 100 additionally includes stacking retention features 112. The stacking retention features 112 are disposed outside of the three-dimensional volume defined by the first and second sidewalls 102 and the floor section 104 and extend above the upper edge sides of the sidewalls 102. In the depicted embodiment, the fiber optic splice holder 100 includes first and second stacking retention features 112 that are disposed on the first and second sidewalls 102, respectively. The first and second stacking retention features 112 each attach to the outer surfaces 108 of the first and second sidewalls 102, respectively, at roughly the lengthwise center of these sidewalls 102. More generally, the number and location of the stacking retention features 112 may vary.

The first and second stacking retention features 112 form a pair of opposing surfaces that are above the upper edge sides of the first and second sidewalls 102. This means that the first stacking retention feature 112 includes an inner surface 114 which protrudes above the upper edge side of the first sidewall 102 and the second stacking retention feature 112 includes an inner surface 114 which protrudes above the upper edge side of the second sidewall 102 and faces the inner surface 114 of the first stacking retention feature 112. According to an embodiment, the first stacking retention feature 112 includes a planar inner surface 114 that is substantially parallel to the outer surface 108 of the first sidewall 102, and the second stacking retention feature 112 includes a planar inner surface 114 that is substantially parallel to the outer surface 108 of the second sidewall 102. In this case, the planar inner surfaces 114 of the first and second stacking retention features 112 form the pair of opposing surfaces.

The opposing surfaces between the first and second stacking retention features 112 are separated from one another by a distance that is correlated to a base width of the fiber optic splice holder 100. The base width of the fiber optic splice holder 100 is a separation distance between the outer surfaces 108 of the first and second sidewalls 102 in a second direction (D2) (shown in FIG. 1B) that is perpendicular to the first direction (D1). Put another way, the base width refers to a maximum displacement of the fiber optic splice holder 100 in a width direction which runs perpendicular to the spaced apart sidewalls 102. As used herein, the term "correlated" encompasses an exact match between the base width and the separation distance, i.e., a 1:1 ratio, and a linear or proportional relationship, e.g., ratio of 1:1.1 or 1:0.9. In either case, the separation distance between the opposing surfaces of the first and second stacking retention features 112 is determined by the base width of the fiber optic splice holder 100. As can be seen in FIG. 1A, the inner surfaces 114 of the first and second stacking retention features 112 are slightly offset from the outer surfaces 108 of the first and second sidewalls 102. Hence, in this embodiment, the correlation is such that the opposing surfaces of the first and second stacking retention features 112 are separated from one another by a distance that is slightly larger than the base width.

The inner surface 114 of the first stacking retention feature 112 forms an angled intersection 116 with the upper edge side of the first sidewall 102, and the inner surface 114 of the second stacking retention feature 112 forms an angled intersection 116 with the upper edge side of the second sidewall 102. These angled intersections 116 occur at the outer surfaces 108 of the first and second sidewalls 102, respectively. These angled intersections 116 may be approximately 90-degree intersections between two planar surfaces.

According to an embodiment, the stacking retention features 112 each include a central opening 118 that is above the upper edge sides of the first and second sidewalls 102, respectively. In the depicted embodiment, the stacking retention features 112 are u-shaped structures, wherein the central opening 118 corresponds to a region that is between the u-shaped structure and the upper edge sides the sidewalls 102. More generally, the central opening 118 can be any perforation that penetrates through an enclosed portion of the stacking retention feature 112.

The fiber optic splice holder 100 additionally includes stacking interlock features 120. The stacking interlock features 120 are disposed on upper edge sides of the sidewalls 102. In the depicted embodiment, the stacking interlock features 120 are configured as planar tabs that extend away from the sidewalls 102 of the fiber optic splice holder 100 in opposite direction from one another. Specifically, the fiber optic splice holder 100 includes two planar tabs forming stacking interlock features 120 on the upper edge sides of the first sidewall 102, and two planar tabs forming stacking interlock features 120 on the upper edge sides of the second sidewall 102 that extend away from the interior volume in an opposite direction as the planar tabs on the first sidewall 102. The fiber optic splice holder 100 additionally includes stacking notches 122. The stacking notches 122 are disposed at lower ends of the sidewalls 102. The stacking notches 122 are dimensioned to insertably receive and retain the stacking interlock features 120, respectively. That is, the stacking notches 122 have an inverse shape as the stacking interlock features 120 such that the stacking interlock features 120 can engage with the stacking notches 122 in an interlocking manner. In the depicted embodiment, the fiber optic splice holder 100 includes two stacking notches 122 that that are disposed at the angled intersection 106 with the first sidewall 102, and two stacking notches 122 that that are disposed at the angled intersection 106 with the second sidewall 102. Each stacking notch 122 is vertically aligned with a corresponding stacking interlock feature 120. As used herein, the term "vertically aligned" means that from a direct plan-view of the fiber optic splice holder 100, the "vertically aligned" features overlap with one another. Hence, the stacking interlock features 120 are directly above the stacking notches 122.

The fiber optic splice holder 100 can be a plastic structure, a metal structure, or may include some combination of both materials. The fiber optic splice holder 100 can be produced from one or more planar sheets of material, i.e., uniform thickness sections of plastic or metal. The features of the fiber optic splice holder 100 described above can be formed in or on these planar sheets by techniques including stamping, punching, fusing, etc. In addition, or in the alternative, an injection molding process may be used to form at least some of the features of the fiber optic splice holder 100. For example, an injected molded structure including a planar and continuous floor section 104 and the first and second sidewalls 102 may be formed by injection molding. Subsequently, the optical splice retainers 110 may be formed by punching perforations in the continuous floor section 104.

Figure 2:
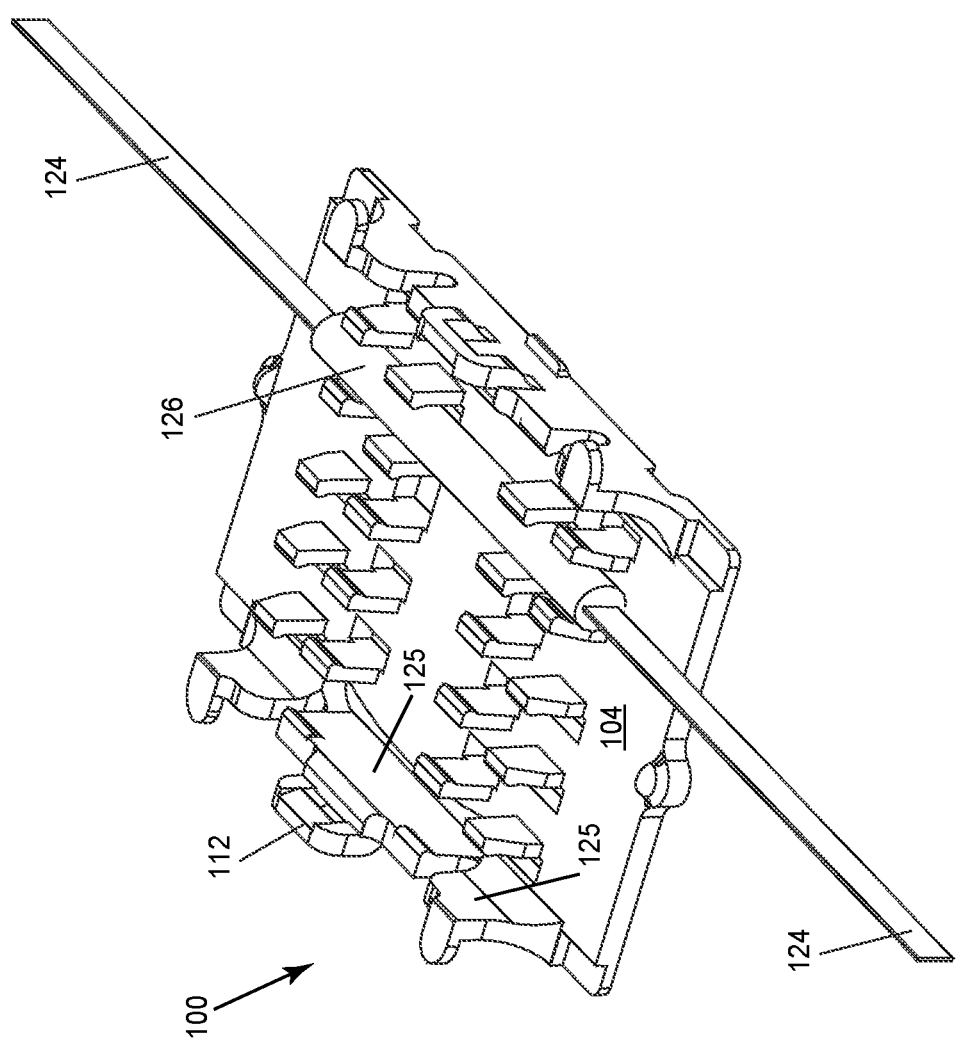
FIG. 2 depicts the fiber optic splice holder with an optical splice securely retained by an optical splice holder, according to an embodiment.

Referring to FIG. 2, the fiber optic splice holder 100 is shown with one of the optical splice retainers 110 retaining a splice between optical fibers 124. In the depicted embodiment, the splice between optical fibers includes a splice protection sleeve 126, which is a standardized component that surrounds and protects the optical fibers 124. The optical splice retainers 110 are implemented as pairs of spaced apart tabs that extend upward form the floor section 104. These tabs are configured to retain a particular fiber optic splice. For example, in the case that the splice protection sleeve 126 has a diameter of 23 mm, the planar tabs forming the optical splice retainers 110 are spaced apart by about the same or slightly less distance, e.g., about 22 mm to provide retention force. More generally, the size, number and arrangement of the optical splice retainers 110 may vary. The optical splice retainers 110 may have any configuration that securely retains a splice between optical fibers 124 itself or a standardized splice component that surrounds the splice, such as the splice protection sleeve 126. According to an embodiment, upper ends of the optical splice retainers 110 that are opposite from the floor section 104 are below the upper edge sides of the sidewalls 102. In this way, the optical splice retainers 110 and the splice between optical fibers do not interfere with the stacking of the fiber optic splice holders 100 as described below.

According to an embodiment, inner surfaces 125 of different sections of the sidewalls 102 are offset from one another. More particularly, the inner surfaces 125 of sections of the sidewalls 102 that include the stacking retention feature 112 are offset in the second direction D2 from inner surfaces 125 of sections of the sidewalls 102 that include the stacking interlock feature 120. That is, the inner surfaces 125 of the sidewalls 102 that include the stacking retention feature 112 are slightly further away from the central volume than the inner surfaces 125 of the sidewalls 102 that include the stacking interlock feature 120. This configuration accommodates a very large splice protection sleeve 126 in the position closest to the sidewall 102 such that the very large splice protection sleeve 126 contacts the sections of the sidewalls 102 that include the stacking interlock feature 120 and not the sections of the sidewalls 102 that include the stacking retention feature 112. In this way, the very large splice protection sleeve 126 does not interfere with the stackability of the assembly by placing outward pressure on the stacking retention feature 112.

Figure 3:
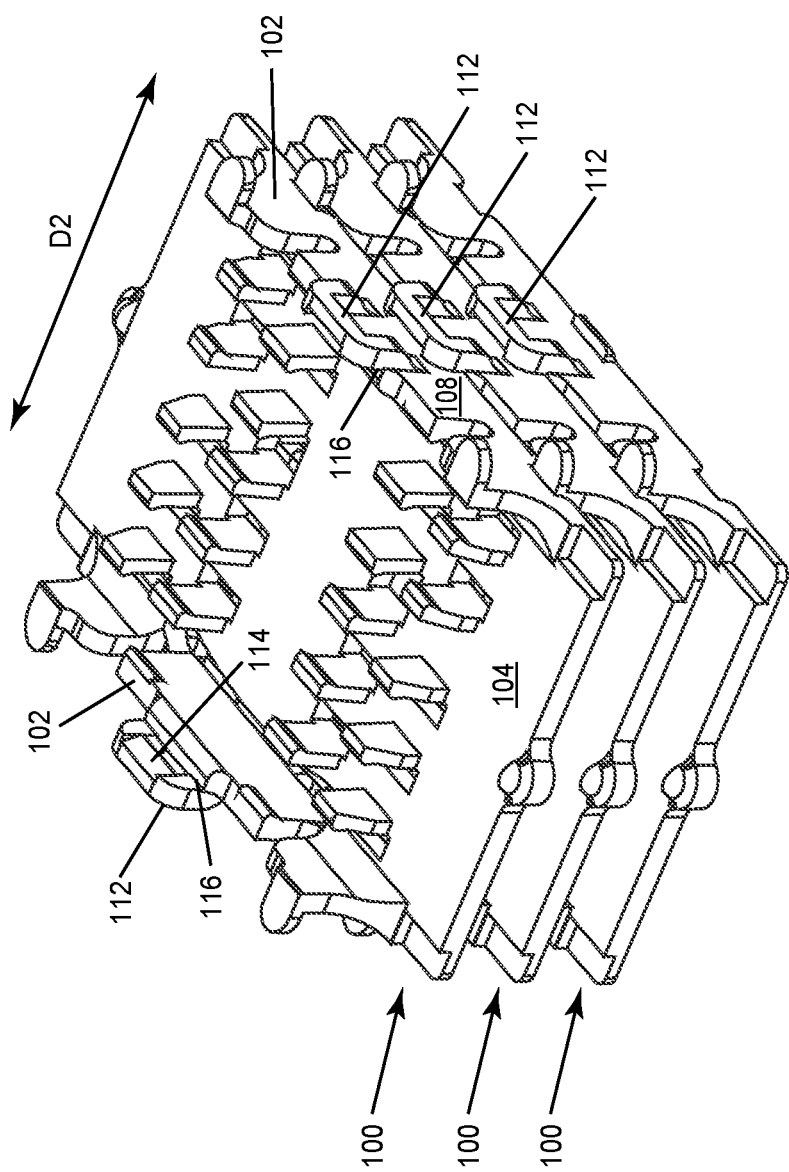
FIG. 3 depicts an isometric view of multiple fiber optic splice holders stacked on top of one another, according to an embodiment.

Referring to FIG. 3, a stacked arrangement of multiple fiber optic splice holders 100 is depicted. The assembly includes three of the fiber optic splice holders 100 as described with reference to FIG. 1. The fiber optic splice holders 100 are stacked on top of one another such that the floor section 104 of the superjacent fiber optic splice holder 100 rests on the upper edge sides of the first and second sidewalls 102 from the subjacent fiber optic splice holder 100.

The stacking retention features 112 advantageously allow for the superjacent fiber optic splice holder 100 to be placed on top of the subjacent fiber optic splice holder 100 with the two items being aligned with one another in the second direction (D2), i.e., the direction perpendicular to the length of the sidewalls 102. The angled intersections 116 between the inner surfaces 114 of the stacking retention features 112 and the respective upper edge sides of the first and second sidewalls 102 form edges that aid in the alignment of the superjacent fiber optic splice holder 100. The inner surfaces 114 of the first and second stacking retention features 112 of the subjacent fiber optic splice holder 100 form mutually opposing planes which face the outer surface 108 of the sidewalls 102 of the superjacent fiber optic splice holder 100, and thus prevent movement of the subjacent fiber optic splice holder 100 in the stacked position. These mutually opposing planes prevent the superjacent fiber optic splice holder 100 from significantly moving in the second direction (D2). In the context of this discussion, a movement is "significant" if the superjacent fiber optic splice holder 100 is permitted to slide enough distance in the second direction (D2) such that one of the angled intersections 106 slips past the upper edge side of one of the sidewalls 102. Put another way, the mutually opposing planes maintain the superjacent fiber optic splice holder 100 on the upper edge sides of both sidewalls 102 from the subjacent fiber optic splice holder 100. This configuration can be achieved by selecting the separation distance between the inner surfaces 114 of the first and second stacking retention features 112 to be less than the base width of the fiber optic splice holder 100 plus the thickness of one of the sidewalls 102.

By arranging the inner surfaces 114 of the stacking retention features 112 to be parallel with the outer surfaces 108 of the sidewalls 102, the interfacing surfaces of the subjacent and superjacent fiber optic splice holder 100 align with one another. In this way, the inner surfaces 114 of the stacking retention features 112 from the subjacent fiber optic splice holder 100 can become flush with the outer surface 108 of the superjacent fiber optic splice holder 100, thus providing stable retention force.

In an embodiment, the fiber optic splice holder 100 is configured such that one or both of the inner surfaces 114 of the stacking retention features 112 from a subjacent fiber optic splice holder 100 are spaced apart from the outer surfaces 108 of the superjacent fiber optic splice holder 100. That is, there is adequate spacing between the opposing surfaces of the stacking retention features 112 to allow for a slight degree of interplay of the superjacent fiber optic splice holder 100 in the second direction D2. This configuration can be obtained by correlating the separation distance between mutually opposing inner surfaces 114 of the stacking retention features 112 to be greater than base width of the fiber optic splice holder 100, e.g., about 102% the base width of the fiber optic splice holder 100.

In another embodiment, the fiber optic splice holder 100 is configured such that both of the inner surfaces 114 of the stacking retention features 112 from a subjacent fiber optic splice holder 100 are flush against the outer surfaces 108 of the superjacent fiber optic splice holder 100 in the stacked position. That is, the spacing between the opposing surfaces of the stacking retention features 112 is such that there is no interplay of the superjacent fiber optic splice holder 100 in the second direction (D2). Moreover, this spacing may be selected to provide retention force against both sidewalls 102. This configuration can be obtained by correlating the separation distance between mutually opposing inner surfaces 114 of the stacking retention features 112 to be less than or equal to the base width of the fiber optic splice holder 100, e.g., between about 98% and 100% of the base width of the fiber optic splice holder 100.

In an embodiment, the stacking retention features 112 are slightly elastic with respect to the second direction D2. This means that the stacking retention features 112 can be flexed outward (e.g., by 5 to 10 degrees) by moving upper ends of the stacking retention features 112 away from the outer sidewalls 102 of the fiber optic splice holder 100 through the application of force. When this force is removed, the stacking retention features 112 return to their original position, e.g., at or close to parallel to the outer sidewalls. The degree of force necessary to achieve this flexing is ordinary human hand force. By configuring the stacking retention features 112 to have this elasticity, attachment and detachment of the superjacent fiber optic splice holder 100 is easier to perform by the installer. The flexing of the stacking retention features 112 from the subjacent fiber optic splice holder 100 allows for easy tilting and separation of the superjacent fiber optic splice holder 100. One advantage of the central opening 118 in the stacking retention feature is that is provides increased elasticity for a given material in this regard, in comparison to a continuous structure.

Figure 4:
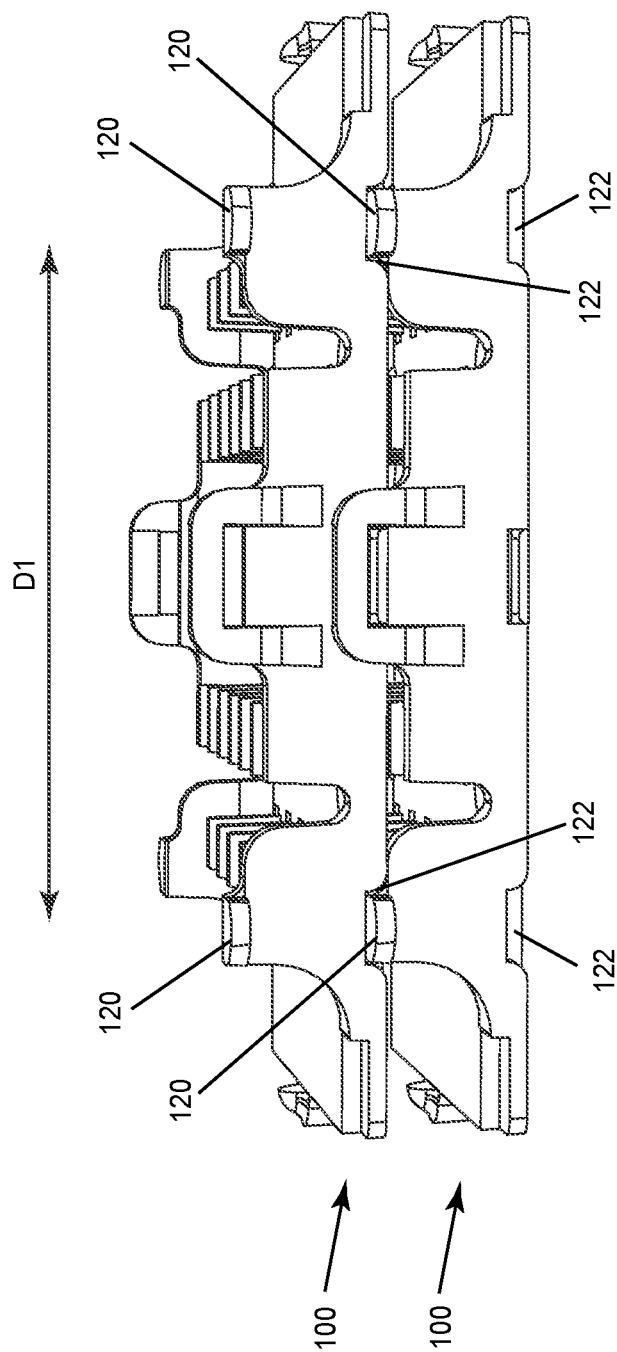
FIG. 4 depicts a side view of multiple fiber optic splice holders stacked on top of one another, according to an embodiment.

Referring to FIG. 4, a stacked arrangement of multiple fiber optic splice holders 100 is depicted. The depicted assembly includes two of the fiber optic splice holders 100 as described with reference to FIG. 1 from a side-view perspective.

The stacking interlock features 120 advantageously allow for the superjacent fiber optic splice holder 100 to be placed on top of the subjacent fiber optic splice holder 100 with the two items being aligned with one another in the first direction (D1). In the stacked arrangement, the stacking interlock features 120 of the subjacent fiber optic splice holder 100 are engaged with the stacking notches 122 of the superjacent fiber optic splice holder 100. The engagement between these features prevents slippage of the superjacent fiber optic splice holder 100 across the upper edge sides of the sidewalls 102 of the subjacent fiber optic splice holder 100 in the first direction (D1). By configuring the fiber optic splice holders 100 such that the stacking notches 122 are vertically aligned with the stacking interlock features 120 of the same fiber optic splice holder 100, direct vertical alignment of multiple fiber optic splice holders 100 is possible. That is, an installer can easily create a multi-tiered arrangement wherein the fiber optic splice holders 100 are aligned with one another.

One advantage of the stacking interlock features 120 being configured as planar tabs and correspondingly shaped notches is that the superjacent fiber optic splice holders 100 can readily pivot about the subjacent fiber optic splice holders 100. This tilting aids in the attachment and detachment of the superjacent fiber optic splice holder 100. More generally, the stacking interlock features 120 and corresponding stacking notches 122 can have any geometric relationship that retains the superjacent fiber optic splice holder 100 when resting on the subjacent fiber optic splice holder 100.

Figure 5:
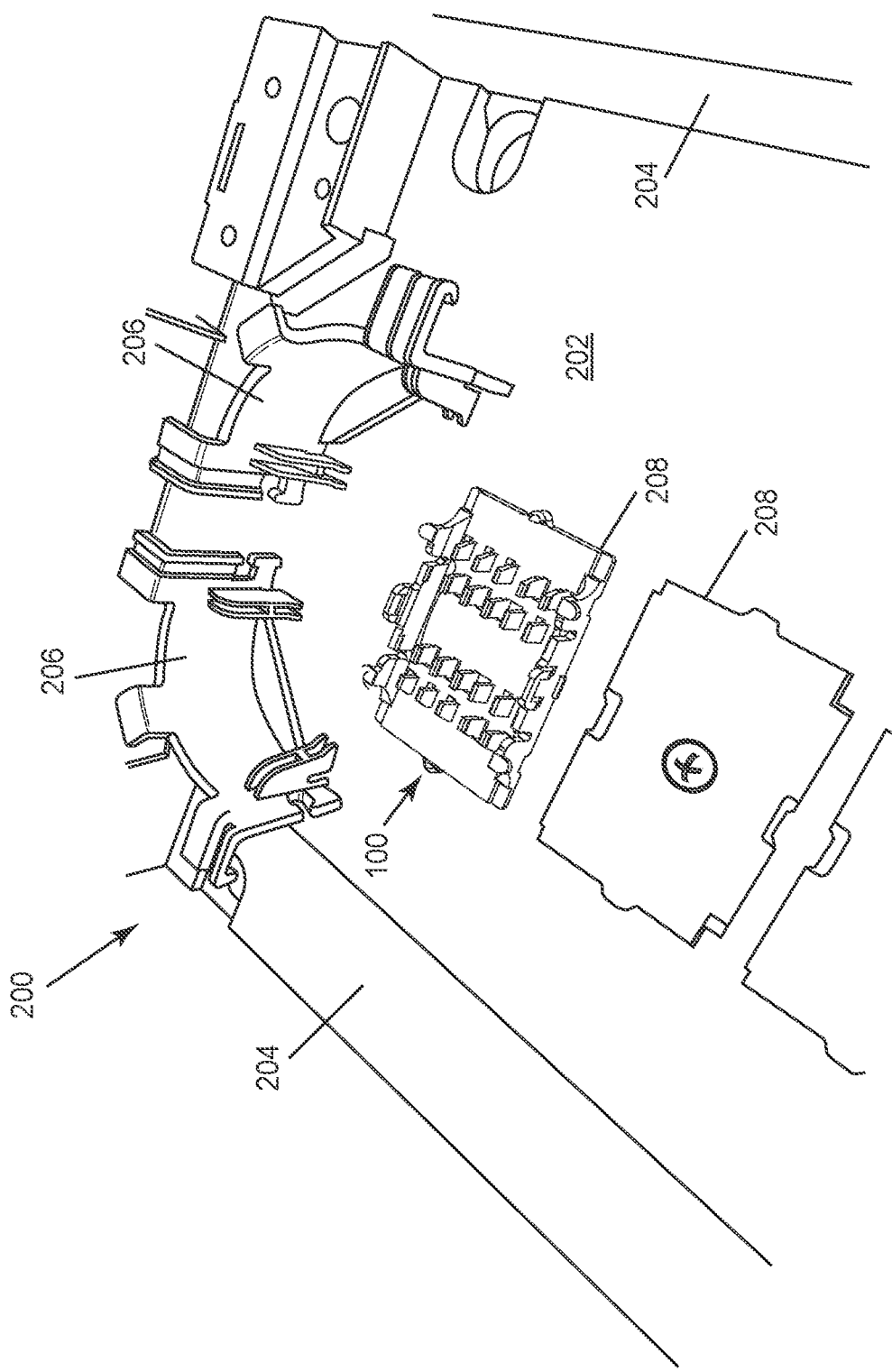
FIG. 5 depicts an assembly of a fiber optic splice holder retained by a receptacle in a back panel of a telecommunications box, according to an embodiment.

Referring to FIG. 5, one of the fiber optic splice holders 100 is incorporated into an assembly that includes a telecommunication box 200. The telecommunication box 200 is an enclosure that stores and protects multiple splices of fiber optic cable and associated lengths of cabling. The telecommunication box 200 includes a planar rear panel 202 and planar outer walls 204 that adjoin the rear panel 202 and surround an interior volume. The telecommunication box 200 may further include a front door (not shown) that that interfaces with the outer walls 204 to provide a secure enclosed space for the storage of fiber optic equipment therein. The telecommunication box 200 additionally includes a pair of curve shaped bend controls 206 anchored to the rear panel 202. The telecommunication box 200 additionally includes a number of receptacles 208 in the back panel 202 disposed between the bend controls 206. In the depicted embodiment, the telecommunication box 200 includes three of these receptacles 208. More generally, the number of receptacles may vary, e.g., one, two, three, four, etc.

As shown in FIG. 5, a fiber optic splice holder 100 is inserted in one of the receptacles 208. The receptacles 208 are dimensioned to receive and securely retain the fiber optic splice holder 100. That is, the receptacles 208 have the same basic geometry as the base portion of the fiber optic splice holder 100 such that lateral movement of the fiber optic splice holder 100 is substantially prevented when the fiber optic splice holder 100 is inserted the receptacle 208.

Figure 6:
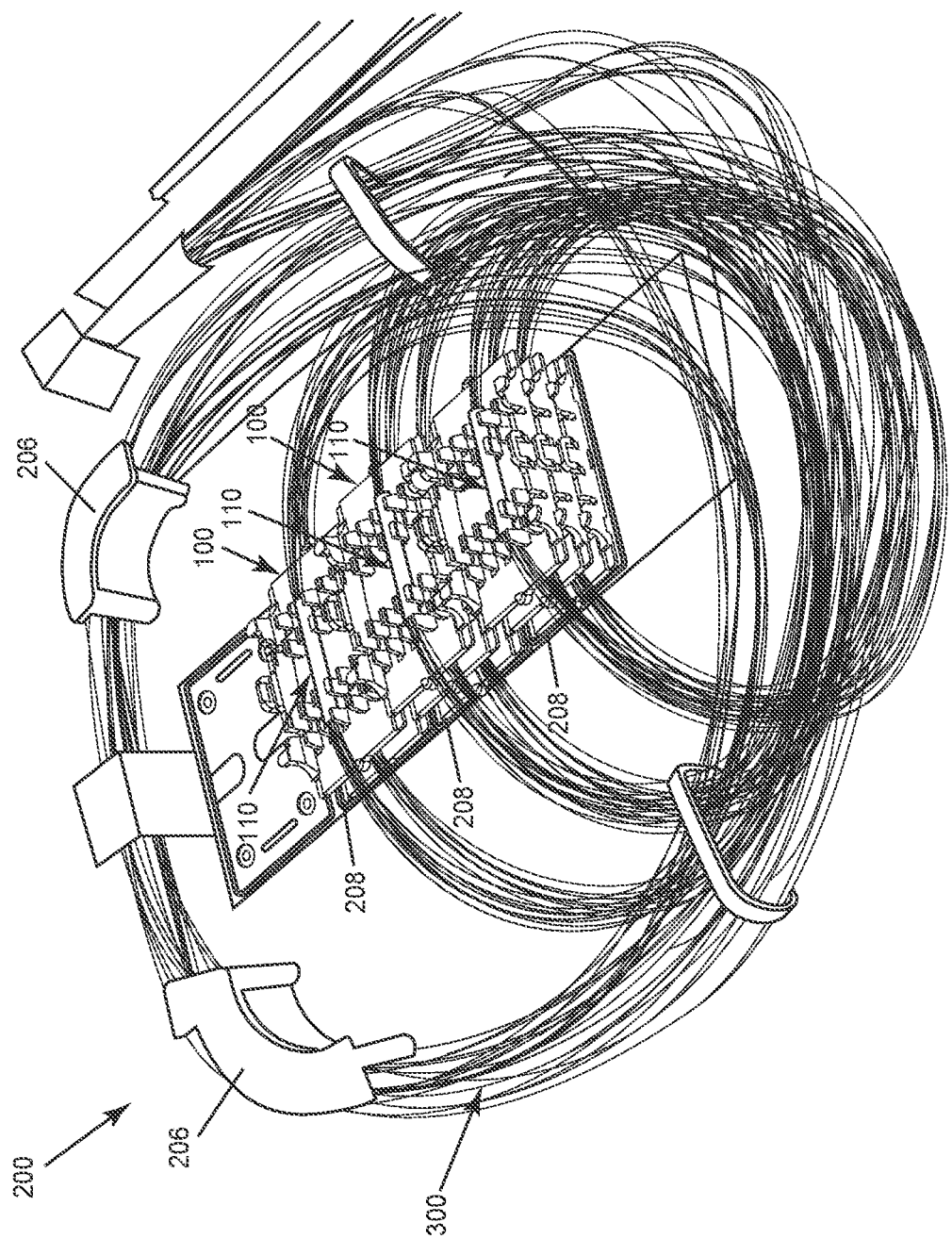
FIG. 6 depicts an assembly of a coil of fiber optic cable and multi-tiered stacks that retain splices of optical fiber from the coil, according to an embodiment.

Referring to FIG. 6, an assembly that includes a telecommunication box 200, multiple fiber optic splice holders 100, and a coil 300 of fiber optic cable is depicted. The coil 300 of fiber optic cable is wrapped around the around the curve shaped bend controls 206. The fiber optic splice holders 100 are arranged in multi-tiered stacks in a similar manner as described with reference to FIGS. 3-4, with the lowermost one of the fiber optic splice holders 100 for each stack being inserted in one of the receptacles 208 in a similar manner as described with reference to FIG. 5. According to an embodiment, the fiber optic cable of the coil 300 is a so-called rollable ribbon fiber optic cable. Rollable ribbon fiber optic cable is a particular kind of high-density cable that includes multiple optical fibers. A single rollable ribbon fiber optic cable can have optical fiber counts of 864, 1152, 1728, 3456, 6912, for example. In rollable ribbon fiber optic cable, the optical fibers rest in a tightly wrapped spiral arrangement. By applying compressive force to the cable, these fibers project out from the spiral, allowing for easy access to each fiber. More generally, the coil 300 can include any of a variety of different cable types. Exemplary cable types include single mode cable, multi-mode cable, indoor-outdoor cable, loose buffer tube cable, and conventional or flat ribbon fiber cable.

In the assembly, splices between the optical fibers from the coil 300 are secured and retained by the optical splice retainers 110 from of the fiber optic splice holders 100. The multi-tiered stacks advantageously provide a high-density arrangement wherein fiber optic splice holders 100 that are stacked on top of one another securely retain a larger number of splices in a small volume. An installer can effectuate one or more splices, secure it within the optical splice retainers 110 of one fiber optic splice holder 100, stack another fiber optic splice holder 100 on top, and repeat the process. The open-ended sides of the fiber optic splice holder 100 (i.e., the ends that do not include outer sidewalls 102) permit the optical fibers on either side of the splice to enter and exit each tier. Once all splices are completed and stored, an installer can quickly and easily access an individual splice by disengaging and unstacking the necessary fiber optic splice holders 100. The system thus offers a simple and cost-effective solution for accommodating a high density of optical splices, e.g., from ribbon fiber optic cable and rollable ribbon fiber optic cable, within a small footprint.

Figure 7:
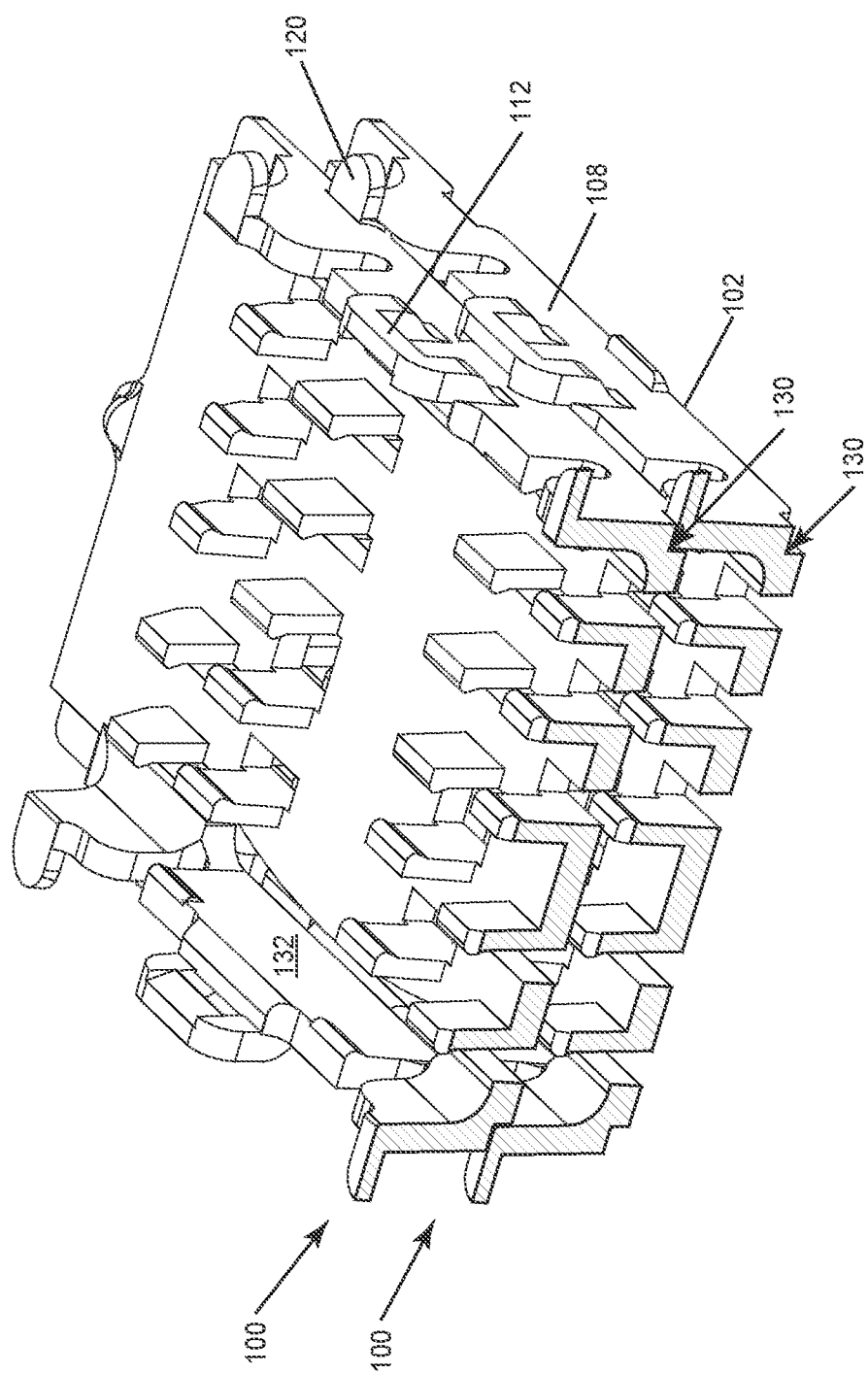
FIG. 7 depicts an isometric view of multiple fiber optic splice holders stacked on top of one another, according to an embodiment.

Referring to FIG. 7, a stacked arrangement of multiple fiber optic splice holders 100 is depicted, according to an embodiment. The fiber optic splice holders 100 in the assembly of FIG. 7 are different from the previously disclosed embodiments with respect to the stackability features. In this embodiment, the stackability are features designed to interface with the inner surfaces 132 of the first and second sidewalls 102 of the subjacent fiber optic splice holder 100. According to an embodiment, the stackability features include a notch 128 disposed at the first and second angled intersections 106 between outer surfaces 108 of the first and second sidewalls 102 and the lower surface of the fiber optic splice holders 100. Additionally, the stackability features include an angled protrusion 130 at an upper intersections between inner surfaces 132 of the first and second sidewalls 102 and the upper edge sides of the of the first and second sidewalls 102. In the stacked arrangement, the notch 128 of the subjacent fiber optic splice holder 100 engages with the angled protrusion 130 of the superjacent fiber optic splice holder 100, thereby mechanically coupling the two fiber optic splice holders 100 together. In the depicted embodiment, the notch 128 and the angled protrusion 130 are arranged to provide a snap-in function. That is, modest mechanical force is required to engage and disengage the angled protrusion 130 of the superjacent fiber optic splice holder 100 with the notch 128 of the subjacent fiber optic splice holder 100, due to the orientation and angle of these features. In this way, a secure interlocking connection can be effectuated. More generally, the notch 128 and the angled protrusion 130 can have any arrangement which provides interlocking and/or retention in the stacked arrangement.

The fiber optic splice holder 100 of FIG. 7 may optionally include the stacking retention features 112 and/or the stacking interlock features 120 and stacking notches 122 as previously discussed. Because the embodiment of FIG. 7 includes stackability features that are designed to engage with the inner surfaces 132 of the first and second sidewalls 102 of the subjacent fiber optic splice holders 100, the stacking retention features 112 of the subjacent fiber optic splice holders 100 may be spaced apart from the outer sidewalls 108 of the superjacent fiber optic splice holder 100 in the stacked arrangement. In that case, the stacking retention features 112 may function as a handle for stacking, and as an outer guide to loosely align the stacked fiber optic splice holders 100. In other embodiments, the stacking retention features 112 and/or the stacking interlock features 120 and stacking notches 122 may be omitted in lieu of the notch 128 and angled protrusion 130 system.

Figure 8:
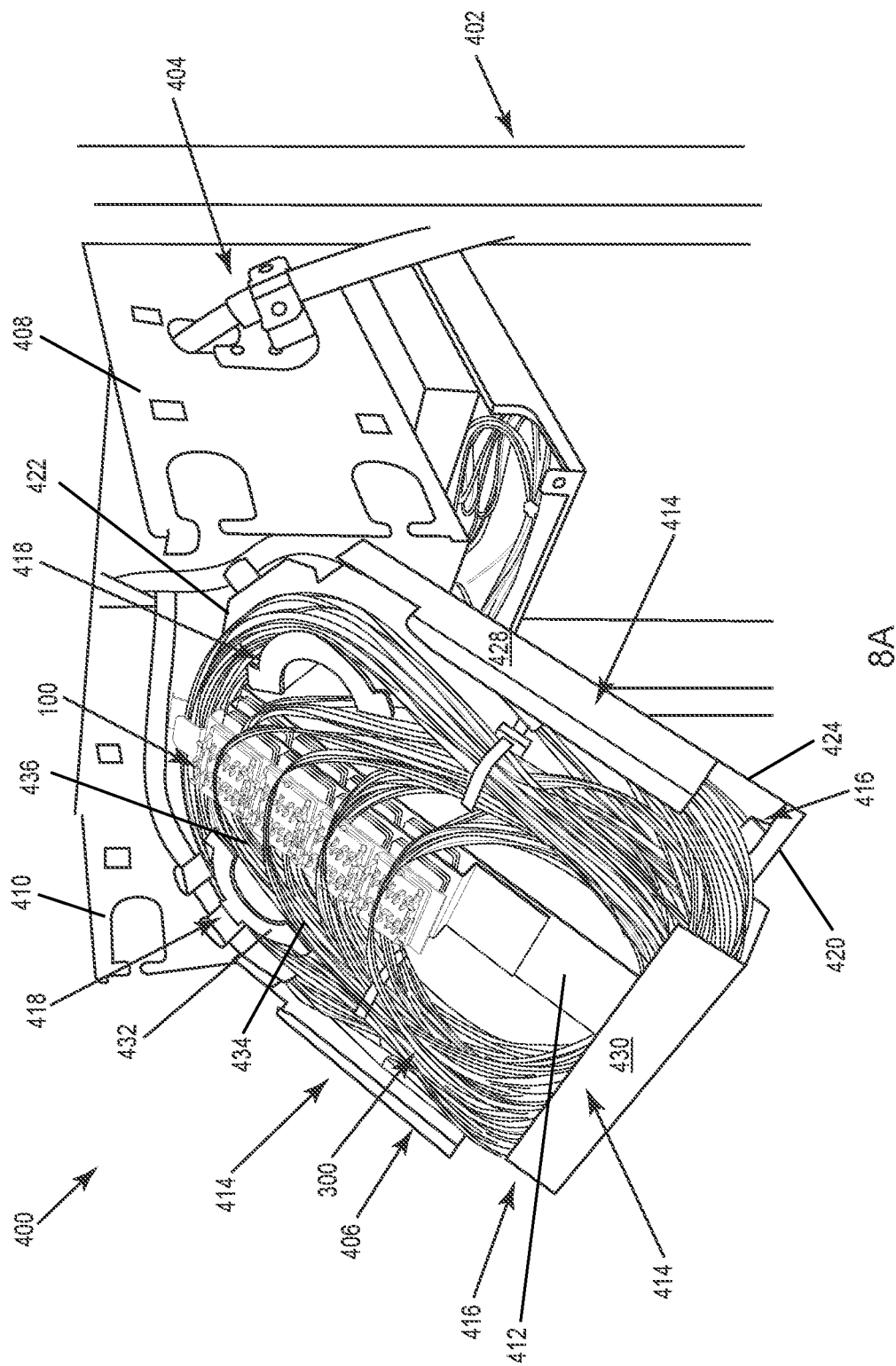
FIG. 8, which includes
Figure 8:
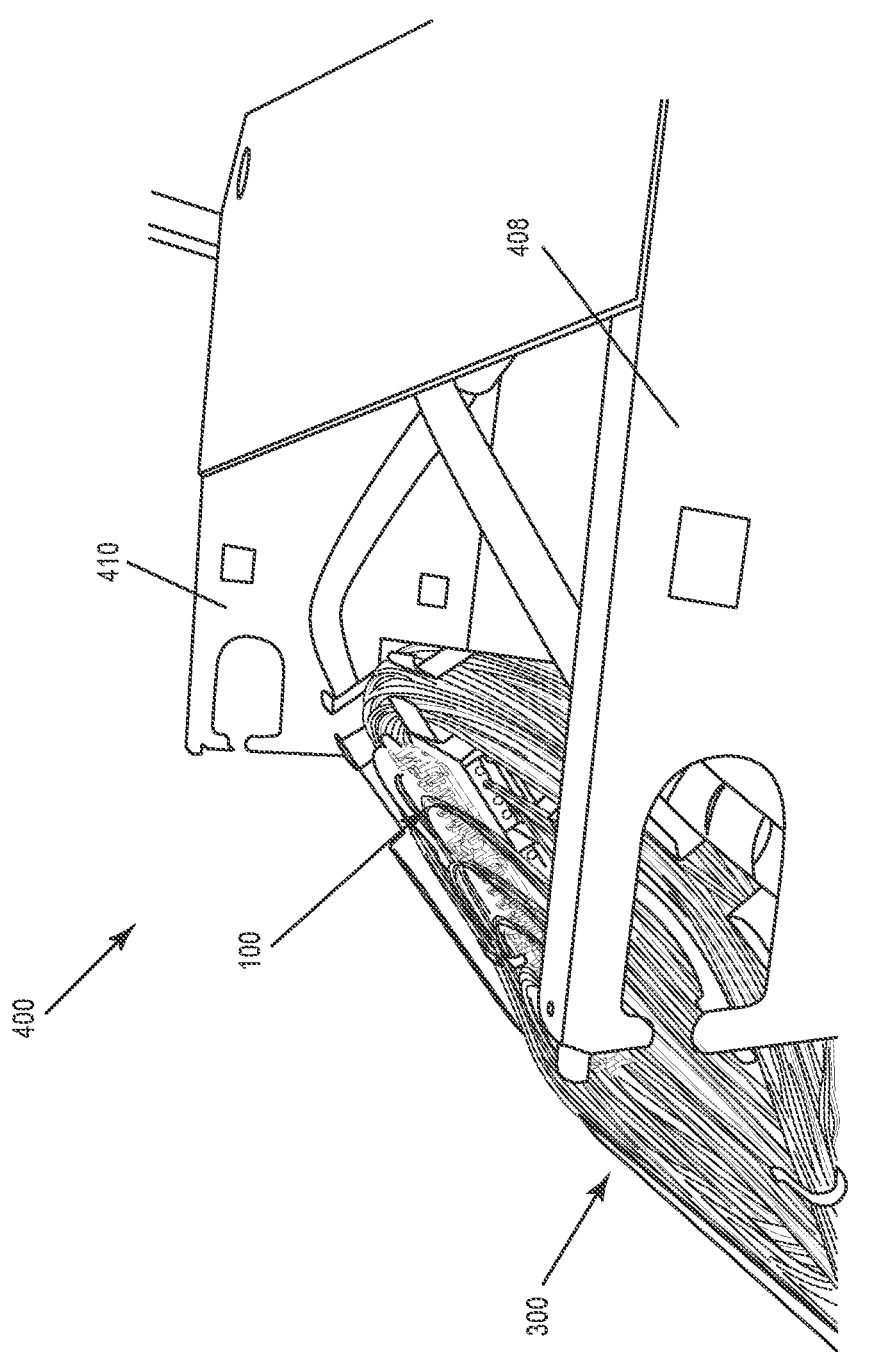
Figure 8:
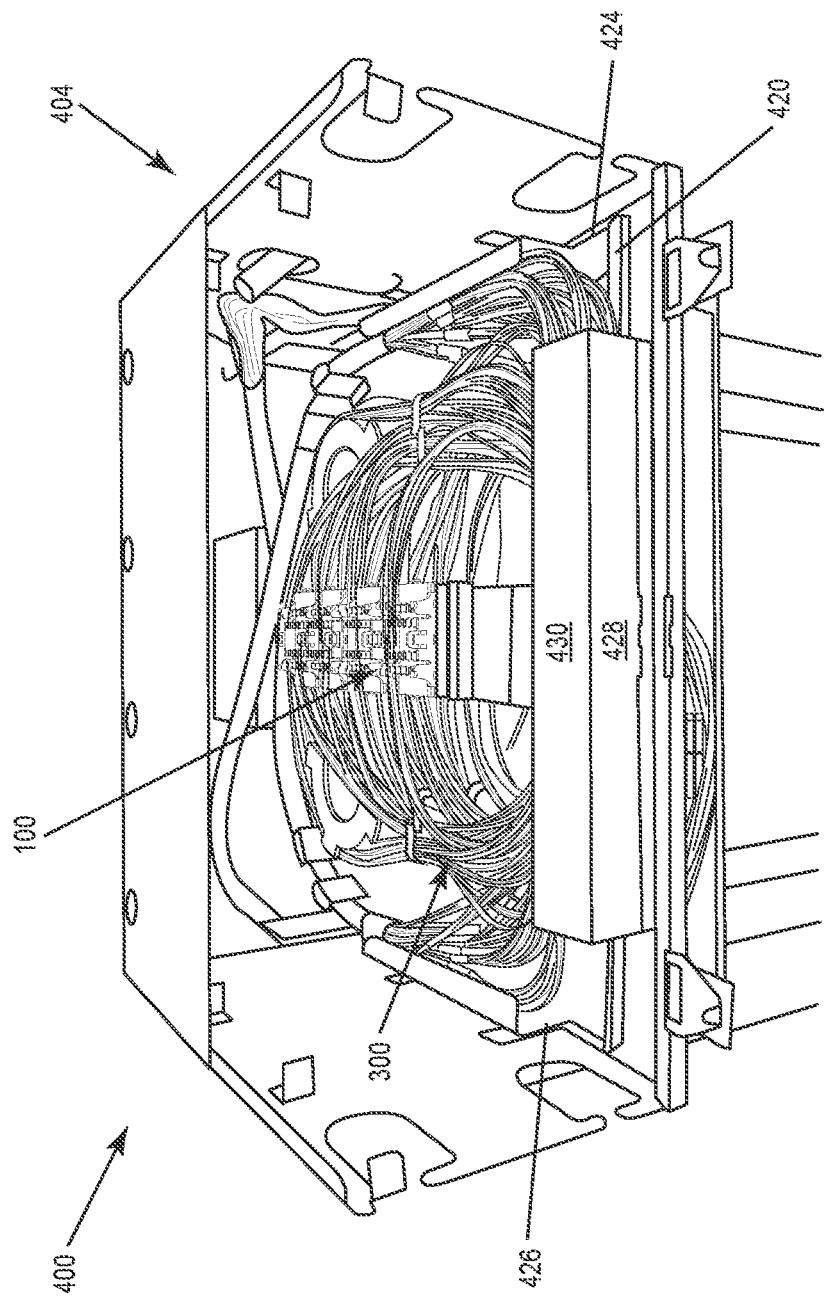

Referring to FIG. 8, a fiber optic cable and splice storage assembly 400 is depicted, according to an embodiment. The assembly 400 includes a rack 402, a cabinet 404 secured to the rack 402, a storage compartment 406, a multi-level stack of fiber optic splice holders 100, a coil 300 of fiber optic cables stored within the storage compartment 406, and a number of splices between optical fibers from the fiber optic cables that are securely retained by optical splice retainers 110 from the fiber optic splice holders 100.

The rack 402 includes two spaced apart rails, each of which have regularly spaced apart perforations. The perforations accommodate fasteners, e.g., screws, bolts, push pins, etc., that enable the mounting of the cabinet 404. While the figures depict only one of the cabinets 404 secured to the rack 402, multiple identical or similar ones of the cabinets 404 may be secured to the rack 402 using the perforations at different vertical levels.

The cabinet 404 is a generally cubic enclosure with first and second outer walls 408, 410 that are spaced apart from one another. The storage compartment 406 may rest on a floor section of the as a standalone component. Alternatively, the storage compartment 406 may be secured to the first and second outer walls 408, 410 by a sliding mechanism, e.g., by a drawer slide. As shown in FIGS. 8A and 8B, the storage compartment 406 can be extracted from the cabinet 404 such that a substantial majority of the storage compartment 406 is outside of front edge sides of the first and second outer walls 408, 410. Moreover, the storage compartment 406 can be tilted downward towards a ground surface in a tilted position when extracted. In the case that the storage compartment 406 is secured to the first and second outer walls 408, 410 by a sliding mechanism, the assembly 400 may include a tilting mechanism (e.g., hinge) to enable this tilting. In the case that the storage compartment 406 is a standalone component, the cabinet 404 and storage compartment 406 may include engagement features such as a hook and receptacle that maintain the storage compartment 406 in the tilted position.

The storage compartment 406 includes a lower panel 412, a plurality of receptacles 208 (e.g., similar to those shown in FIG. 5) disposed on or within a planar surface of the lower panel 412, a plurality of retaining walls 414 disposed at peripheral edges of the lower panel 412, a number of gaps 416 between immediately adjacent ones of the retaining walls 414, and first and second bend controls 418 disposed on the lower panel 412.

A plurality of the fiber optic splice holders 100 is disposed in a central region of the storage compartment 406. The plurality includes a first level of the fiber optic splice holders 100. Each of the fiber optic splice holders 100 in the first level are securely retained by the receptacles 208 with the floor sections 104 of the fiber optic splice holders 100 facing the lower panel 412. This arrangement may be similar to the arrangement described with reference to FIG. 5 or 6, wherein the receptacles 208 are configured as recesses in the lower panel 412. Alternatively, the storage compartment 406 may include a frame-like structure that is secured to the lower panel 412 and includes receptacles the fiber optic splice holders 100 in a similar manner. The fiber optic splice holders 100 additionally includes second, third and fourth levels of the fiber optic splice holders 100 that are successively stacked on top of one another. Although FIG. 8 depicts a stack of fiber optic splice holders 100 with planar sheets separating each stack, these sheets are not necessary. The fiber optic splice holders 100 of each level can be stacked directly on top of the fiber optic splice holders 100 from the subjacent level using the stacking retention features 112 and/or the stacking interlock features 120 as previously described and shown in FIG. 6, for example. The multi-layer stack shown in FIGS. 10-12 illustrates just one example of potential configurations. The concept is more generally applicable to different numbers of fiber optic splice holders 100, e.g., different numbers of levels and/or different numbers of fiber optic splice holders 100 in each level. The retaining walls 414 are disposed at peripheral edges of the lower panel 412. In particular, the peripheral edges of the lower panel 412 include a front edge side 420, a rear edge side 422 that is opposite from the front edge side 420, and first and second outer edge sides 424, 426 that each extend between the front edge side 420 and the rear edge side 422. A first one of the retaining walls 414 adjoins the first outer edge side 424, a second one of the retaining walls 414 adjoins the second outer edge side 426, and a third one of the retaining walls 414 adjoins the front edge side 420. The retaining walls 414 each include a lower section 428 that adjoin the lower panel 412 and an upper section 430 that adjoins the lower section 428 and extends over the lower panel 412.

The first and second bend controls 418 are disposed on the lower panel 412 with the receptacles 208 (and hence fiber optic splice holders 100) being disposed between the first and second bend controls 418 and being disposed closer to the rear edge side 422 than the front edge side 420. The first and second bend controls 418 each include a curved surface (i.e., the surface which faces the cables from the coil 300) that extends substantially transversely to the lower panel 412, and an upper planar section 432 that is parallel to and spaced apart from the lower panel 412 and extends towards the peripheral edges of the lower panel 412.

The coil 300 of fiber optic cables may be similar or identical to the coil 300 described with reference to FIG. 6. Splices between the optical fibers from the coil 300 are secured and retained by the optical splice retainers 110 from of the fiber optic splice holders 100 in a similar manner as previously described.

The retaining walls 414 are designed to retain the coil 300 of fiber optic cable within the storage compartment 406. In particular, the upper sections 430 of the retaining walls 414 partially cover the coil 300 and thus provide a partial vertical barrier to maintain the coil 300 of fiber optic cable between the upper sections 430 and the lower panel 412. The lower sections 428 of the retaining walls 414 provide a partial outer lateral barrier to maintain the coil 300 within a footprint of the storage compartment 406. The gaps 416 partially expose the coil 300, and thus make the coil 300 more accessible and more easily manipulated by an installer. In the depicted embodiment, the gaps 416 include a first gap 416 between the first and third retaining walls 414 and a second gap 416 between the second and third retaining walls 414. The first gap 416 exposes an intersection between the first outer edge side 424 and the front edge side 420, and the second gap 416 exposes an intersection between the second outer edge side 426 and the front edge side 420.

Thus, a bottom of the coil 300 is accessible from the front of the storage compartment 406 by the first and second gaps 416. As shown, the rear outer edge side 422 does not include any of the retaining walls 414, and thus the coil 300 is easily accessed from this side. This arrangement illustrates just one potential configuration of retaining walls 414 that partially retain the coil 300 but are arranged with gaps 416 between immediately adjacent retaining walls 414 to provide access.

The bend controls 418 work in combination with the retaining walls 414 to accommodate a large coil 300 of fiber optic cable in an organized fashion. The upper planar sections 432 of the bend controls 418 provide a partial vertical barrier to the coil 300 in a similar manner as the upper sections 430 of the retaining walls 414. The curved surfaces of the bend controls 418 define a large radius for the coil 300 to be routed in this manner. In more detail, the bend controls 418 each include a first end 434 that is closer to the front edge side 420 and a second end 436 that is closer to the rear edge side 422, with the curved surface of each of the bend controls 418 extending continuously between the first and second ends 434, 436 of the respective bend control 418. Along this path, the curved surface may form an arc of at least 120 degrees, at least 150 degrees or at least 180 degrees, for example. A radius of the curved surface may be between about 5 inches and 15 inches. The first and second bend controls 418 may be arranged such that the respective curved surfaces extend toward one another at the first ends 436. Additionally or alternatively, the first and second bend controls 418 may be arranged such that a peak of the respective curved surfaces that is closest to the first or second outer edge sides 424, 426, as the case may be, is between the first and second ends 434, 436. These features collectively or individually enable the routing of a large diameter coil 300 around a periphery of the storage compartment 406.

Exemplary dimensions for the storage compartment 406 are as follows. A width of the storage compartment 406 can be between about 10 inches and 20 inches, wherein the width of the storage compartment 406 is a distance between the first and second outer edge sides 424, 426. A height of the storage compartment 406 can be between about 10 inches and 20 inches, wherein the height of the storage compartment 406 is a separation distance between the front edge side 420 and the rear edge side 422. The depth of the storage compartment 406 can be between about 1 inches and 2 inches, wherein the depth of the storage compartment 406 is a separation distance is measured between lower panel 412 and the upper sections 430 of the retaining walls 414 or the upper planar sections 432 of the bend controls 418 (whichever is higher). In one specific example, both the width and the height of the storage compartment 406 are about 15 inches and the depth of the storage compartment 406 is about 1 and ⅝th inches. Stated in volumetric terms, a total volume of an interior space that is between lower panel 412 and the upper sections 430 of the retaining walls 414 or the upper planar sections 432 of the bend controls 418 (whichever is higher) can be between about 200 cubic inches and 1,000 cubic inches.

The storage compartment 406 described above is significantly larger that conventional devices for storing multiple splices, e.g., fusion splice trays. These devices are typically not larger than about 25 cubic inches, e.g., having a width and height of 5 inches and a depth of 1 inch. The reason that these devices are not any larger is that, conventionally, no apparatus exists for providing a high number optical splices (e.g., greater than 288 optical splices) in a single device. Thus, any additional volume is extraneous and unnecessary. By contrast, the fiber optic splice holders 100 described herein in combination with modern splice cable, e.g., rollable ribbon fiber, allow for a much higher density of optical fibers. To this end, the dimensioning of the storage compartment 406 is designed to accommodate a large coil 300 of rollable ribbon cable. For instance, a diameter of the coil 300 can be in the range of 10 to 20 inches and a height of the coil 300 can be in the range of 1 to 2 inches, wherein the height of the coil 300 is a distance between a bottom side of the coil 300 that contacts the lower panel 412 and a top side of the coil 300 that is opposite from the bottom side. A coil 300 of this size can include 288, 432, 576, 864, 1152, 1728 or more individual optical fibers. Pairs of individual optical fibers from this coil 300 can be spliced together and stored in the fiber optic splice holders 100. Because the fiber optic splice holders 100 are stackable, the splices of optical fibers can be layered directly on top of one another in a space saving manner.

An exemplary embodiment of a fiber optic cable and splice storage compartment 406 comprises a lower panel 412, a plurality of receptacles 208 disposed on or within a planar surface of the lower panel 412, each of the receptacles 208 being dimensioned to insertably receive and retain a rectangular fiber optic splice holders 100, a plurality of retaining walls 414 disposed at peripheral edges of the lower panel 412, each of the retaining walls 414 comprising a lower section 428 that adjoins the lower panel 412 and an upper section 430 that adjoins the lower section 428 and extends over the lower panel 412, one or more gaps 416 between immediately adjacent ones of the retaining walls 414, first and second bend controls 418 disposed on the lower panel 412, wherein the plurality of receptacles 208 is disposed between the first and second bend controls 418, and wherein the first and second bend controls 418 each comprise a curved surface that extends substantially transversely to the lower panel 412.

Separately or in combination, the peripheral edges of the lower panel 412 comprise a front edge side 420, a rear edge side 422 that is opposite from the front edge side 420, and first and second outer edge sides 424, 426 that each extend between the front edge side 420 and the rear edge side 422, and the first and second bend controls 418 are each disposed closer to the rear edge side 422 than the front edge side 420.

Separately or in combination, each of the bend controls 418 comprise a first end 434 that is closer to the front edge side 420 and a second end 436 that is closer to the rear edge side 422, and the curved surface of each of the bend controls 418 extends continuously between the first and second ends 434, 436 of the respective bend control 418.

Separately or in combination, the curved surface of each bend control 418 curves by at least 180 degrees.

Separately or in combination, the first and second bend controls 418 each comprise an upper planar section 432 that is parallel to and spaced apart from the lower panel 412 and extends towards the peripheral edges of the lower panel 412.

Separately or in combination, the plurality of retaining walls 414 comprises a first one of the retaining walls 414 that adjoins the first outer edge side 424, a second one of the retaining walls 414 that adjoins the second outer edge side 426, and a third one of the retaining walls 414 that adjoins the front edge side 420.

Separately or in combination, the gaps 416 comprise a first gap 416 between the first and third retaining walls 414 and a second gap 416 between the second and third retaining walls 414, the first gap 416 exposes an intersection between the first outer edge side 424 and the front edge side 420, and the second gap 416 exposes an intersection between the second outer edge side 426 and the front edge side 420.

Separately or in combination, a width of the storage compartment 406 is between about 10 inches and 20 inches, the width of the storage compartment 406 being a distance between the first and second outer edge sides 424, 426.

Separately or in combination, a height of the storage compartment 406 is between about 10 inches and 20 inches, the height of the storage compartment 406 being a separation distance between the front edge side 420 and the rear edge side 422.

Separately or in combination, a depth of the storage compartment 406 is between about 1 inches and 2 inches, the depth of the storage compartment being measured between the lower panel 412 and the upper sections 430 of the retaining walls 414 or the upper planar sections 432 of the bend controls 418.

An exemplary embodiment of a fiber optic cable and splice storage assembly 400 comprises a storage compartment 406, comprising a lower panel 412, a plurality of receptacles 208 disposed on or within a planar surface of the lower panel 412, a plurality of retaining walls 414 disposed at peripheral edges of the lower panel 412, each of the retaining walls 414 comprising a lower section 428 that adjoins the lower panel 412 and an upper section 430 that adjoins the lower section 428 and extends over the lower panel 412, one or more gaps 416 between immediately adjacent ones of the retaining walls 414, and first and second bend controls 418 disposed on the lower panel 412, a plurality of fiber optic splice holders 100, each of the fiber optic splice holders 100 comprising first and second sidewalls 102 that are laterally spaced apart from one another, a floor section 104 adjoining lower ends of the first and second sidewalls 102 and extending between the first and second sidewalls 102, one or more optical splice retainers 110 disposed between the first and second sidewalls 102 on an upper surface of the floor section 104, wherein the fiber optic splice holders 100 comprise a first level of the fiber optic splice holders 100 that are securely retained by the receptacles 208 with the floor section 104 of the fiber optic splice holders 100 facing the lower panel 412.

Separately or in combination, the plurality of fiber optic splice holders 100 further comprises a second level of the fiber optic splice holders 100 stacked on top of the first level of the fiber optic splice holders 100.

Separately or in combination, the assembly 400 further comprises a plurality of fiber optic cables that are stored within the storage compartment 406, wherein optical fibers of the plurality are spliced together, wherein the splices between the optical fibers are securely retained by the optical splice retainers 110, and wherein the fiber optic cables are organized in a coil 300 that wraps around both of the bend controls 418.

Separately or in combination, the coil 300 is partially covered by the upper sections 430 of the retaining walls 414, and wherein the coil 300 is partially exposed by the one or more gaps 416.

Separately or in combination, the splices of the optical fibers are retained by the fiber optic splice holders 100 from the first and second levels such that at least some of the splices of the optical fibers are layered on top of one another.

Separately or in combination, the plurality of fiber optic cables comprises at least 288 of the splices of the optical fibers.

Separately or in combination, a diameter of the coil 300 is at least 12 inches, and a height of the coil 300 is at least 1.25 inches, the height of the coil 300 being a distance between a bottom side of the coil 300 that contacts the lower panel 412 and a top side of the coil 300 that is opposite from the bottom side.

Separately or in combination, the fiber optic cable and splice storage assembly 400 further comprises a rack 402 comprising two spaced apart rails, each of the rails having regularly spaced apart perforations, and a cabinet 404 secured to the rack 402 and comprising first and second outer walls 408, 410 that are spaced apart from one another.

Separately or in combination, the fiber optic cable and splice storage assembly 400 further comprises a tilting mechanism that is configured to permit the storage compartment 406 to tilt downward in the extracted position.

The term "substantially" encompasses absolute conformity with a requirement as well as minor deviation from absolute conformity with the requirement due to manufacturing process variations, assembly, and other factors that may cause a deviation from the ideal. For example, typical processing techniques form parts within a statistical range of acceptable conformance. If the element in question is within this range of acceptable conformance, it is substantially compliant with the property in question.

Spatially relative terms such as "under," "below," "lower," "over," "upper," "top," bottom" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A fiber optic cable and splice storage compartment comprising:

a lower panel;
a plurality of receptacles disposed on the lower panel, each of the receptacles being dimensioned to insertably receive and retain a plurality of rectangular fiber optic splice holders in a stack, the plurality of rectangular fiber optic splice holders, respectively including:
a pair of sides,
a stacking retention catch extending from an upper edge of each of the pair of sides, and
a stacking retention tab extending outward from a lower edge of each of the pair of sides, the stacking retention tab being vertically aligned with the stacking retention catch;
a plurality of retaining walls disposed at peripheral edges of the lower panel, each of the retaining walls comprising a lower section that adjoins the lower panel and an upper section that adjoins the lower section and extends over the lower panel;
one or more gaps between immediately adjacent ones of the retaining walls;
a first bend control disposed on the lower panel and a second bend control disposed on the lower panel,
wherein the first and second bend controls include, respectively, a curved surface that extends substantially transversely to the lower panel,
wherein the first and second bend controls are arranged to contain loops of fiber optic cable slack length routed around and outside of the receptacles,
wherein each of the bend controls include a first end that is closer to a front edge side of the lower panel, and a second end that is closer to a rear edge side of the lower panel, and
wherein the respective curved surfaces of the first and second bend controls curve towards the receptacles as they approach the first end of the respective bend control.

2. The fiber optic cable and splice storage compartment of claim 1, wherein the peripheral edges of the lower panel comprise a front edge side, a rear edge side that is opposite from the front edge side, and first and second outer edge sides that each extend between the first and second edge sides, and wherein the first and second bend controls are each disposed closer to the rear edge side than the front edge side.

3. The fiber optic cable and splice storage compartment of claim 2, wherein the curved surface of each of the bend controls extends continuously between the first and second ends of the respective bend control.

4. The fiber optic cable and splice storage compartment of claim 3, wherein the curved surface of each bend control curves by at least 180 degrees.

5. The fiber optic cable and splice storage compartment of claim 3, wherein the first and second bend controls each comprise an upper planar section that is parallel to and spaced apart from the lower panel and extends towards the peripheral edges of the lower panel.

6. The fiber optic cable and splice storage compartment of claim 2, wherein the plurality of retaining walls comprises a first one of the retaining walls that adjoins the first outer edge side, a second one of the retaining walls that adjoins the second outer edge side, and a third one of the retaining walls that adjoins the front edge side.

7. The fiber optic cable and splice storage compartment of claim 6, wherein the gaps comprise a first gap between the first and third retaining walls and a second gap between the second and third retaining walls, wherein the first gap exposes an intersection between the first outer edge side and the front edge side, and wherein the second gap exposes an intersection between the second outer edge side and the front edge side.

8. The fiber optic cable and splice storage compartment of claim 5, wherein a width of the storage compartment is between about 10 inches and 20 inches, the width of the storage compartment being a distance between the first and second outer edge sides.

9. The fiber optic cable and splice storage compartment of claim 5, wherein a height of the storage compartment is between about 10 inches and 20 inches, the height of the storage compartment being a separation distance between the front edge side and the rear edge side.

10. The fiber optic cable and splice storage compartment of claim 5, wherein a depth of the storage compartment is between about 1 inches and 2 inches, the depth of the storage compartment being a separation distance between the lower panel and upper ends of the retaining walls that are opposite from the lower panel.

11. A fiber optic cable and splice storage assembly, comprising:
a storage compartment, comprising:
a lower panel;
a plurality of receptacles disposed on the lower panel;
a plurality of retaining walls disposed at peripheral edges of the lower panel, each of the retaining walls comprising a lower section that adjoins the lower panel and an upper section that adjoins the lower section and extends over the lower panel;
one or more gaps between immediately adjacent ones of the retaining walls; and
first and second bend controls disposed on the lower panel,
a plurality of fiber optic splice holders, each of the fiber optic splice holders comprising:
first and second sidewalls that are laterally spaced apart from one another; a floor section adjoining lower ends of the first and second sidewalls and extending between the first and second sidewalls,
one or more optical splice retainers disposed between the first and second sidewalls on an upper surface of the floor section,
a stacking retention catch extending from an upper edge of each of the first and second sidewalls, and
a stacking retention tab extending outward from a lower edge of each the first and second sidewalls, the stacking retention tab being vertically aligned with the stacking retention catch,
wherein the fiber optic splice holders comprise a first level of the fiber optic splice holders that are securely retained by the receptacles with the floor section of the fiber optic splice holders facing the lower panel.

12. The fiber optic cable and splice storage assembly of claim 11, wherein the plurality of fiber optic splice holders further comprises a second level of the fiber optic splice holders stacked on top of the first level of the fiber optic splice holders.

13. The fiber optic cable and splice storage assembly of claim 12, further comprising a plurality of fiber optic cables that are stored within the storage compartment, wherein optical fibers of the plurality are spliced together, wherein the splices between the optical fibers are securely retained by the optical splice retainers, and wherein the fiber optic cables are organized in a coil that wraps around both of the bend controls.

14. The fiber optic cable and splice storage assembly of claim 13, wherein the coil is partially covered by the upper sections of the retaining walls, and wherein the coil is partially exposed by the one or more gaps.

15. The fiber optic cable and splice storage assembly of claim 13, wherein the splices of the optical fibers are retained by the fiber optic splice holders from the first and second levels such that at least some of the splices of the optical fibers are layered on top of one another.

16. The fiber optic cable and splice storage assembly of claim 13, wherein the plurality of fiber optic cables comprises at least 288 of the splices of the optical fibers.

17. The fiber optic cable and splice storage assembly of claim 16, wherein a diameter of the coil is at least 12 inches, and wherein a height of the coil is at least 1.25 inches, the height of the coil being a distance between a bottom side of the coil that contacts the lower panel and a top side of the coil that is opposite from the bottom side.

18. The fiber optic cable and splice storage assembly of claim 13, further comprising:
   a rack comprising two spaced apart rails, each of the rails having regularly spaced apart perforations; and
   a cabinet secured to the rack and comprising first and second outer walls that are spaced apart from one another.

19. The fiber optic cable and splice storage assembly of claim 18, further comprising a tilting mechanism that is configured to permit the storage compartment to tilt downward in an extracted position.

\* \* \* \* \*